United States Patent
Yamaguchi et al.

[11] Patent Number: 6,024,188
[45] Date of Patent: Feb. 15, 2000

[54] AIR INDUCTION UNIT FOR INTERNAL COMBUSTION ENGINE

[75] Inventors: Akihide Yamaguchi, Kariya; Yurio Nomura, Nagoya; Takao Yamamoto; Syuya Mikami, both of Kariya; Yasutoshi Kameda, Anjo; Toshiaki Nakayama, Nishikamo-gun, all of Japan

[73] Assignee: Denso Corporation, Japan

[21] Appl. No.: 09/081,789

[22] Filed: May 20, 1998

Related U.S. Application Data

[63] Continuation of application No. PCT/JP97/04222, Nov. 19, 1997.

[30] Foreign Application Priority Data

Nov. 22, 1996 [JP] Japan .................................. 8-311950
Nov. 25, 1996 [JP] Japan .................................. 8-313947

[51] Int. Cl.$^7$ .................................................. F02M 35/10
[52] U.S. Cl. ................ 181/204; 123/184.21; 123/184.61
[58] Field of Search ......................... 123/184.21, 184.61; 181/204, 198

[56] References Cited

U.S. PATENT DOCUMENTS 5,259,356  11/1993  Karlsson et al. .
5,269,143  12/1993  Cikanek et al. .................. 123/184.21
5,477,819  12/1995  Kopec .
5,538,571   7/1996  Miyajima .
5,575,247  11/1996  Nakayama et al. .

FOREIGN PATENT DOCUMENTS

| | | |
|---|---|---|
| 52-124309 U | 9/1952 | Japan . |
| 58-173756 U | 11/1983 | Japan . |
| 1-83157 U | 6/1989 | Japan . |
| 1-176743 U | 12/1989 | Japan . |
| 2-40963 U | 3/1990 | Japan . |
| 2-69057 U | 5/1990 | Japan . |
| 2-90354 U | 7/1990 | Japan . |
| 3-260366 | 11/1991 | Japan . |
| 5-57352 U | 7/1993 | Japan . |
| 8-93580 | 4/1996 | Japan . |

*Primary Examiner*—Marguerite McMahon
*Attorney, Agent, or Firm*—Nixon & Vanderhye PC

[57] ABSTRACT

An air induction unit is composed of an air filter, a resinous intake manifold for inducting air filtered by the air filter into intake ports of the engine, a resinous case and a resinous cap. The air filter, intake manifold and fuel injectors are disposed inside the resinous case and the resinous cap. The resinous case and the resinous cap have respectively double-wall structure composed of inside walls and outside walls and noise-and-heat-insulation members between the inside walls and the outside walls.

18 Claims, 7 Drawing Sheets

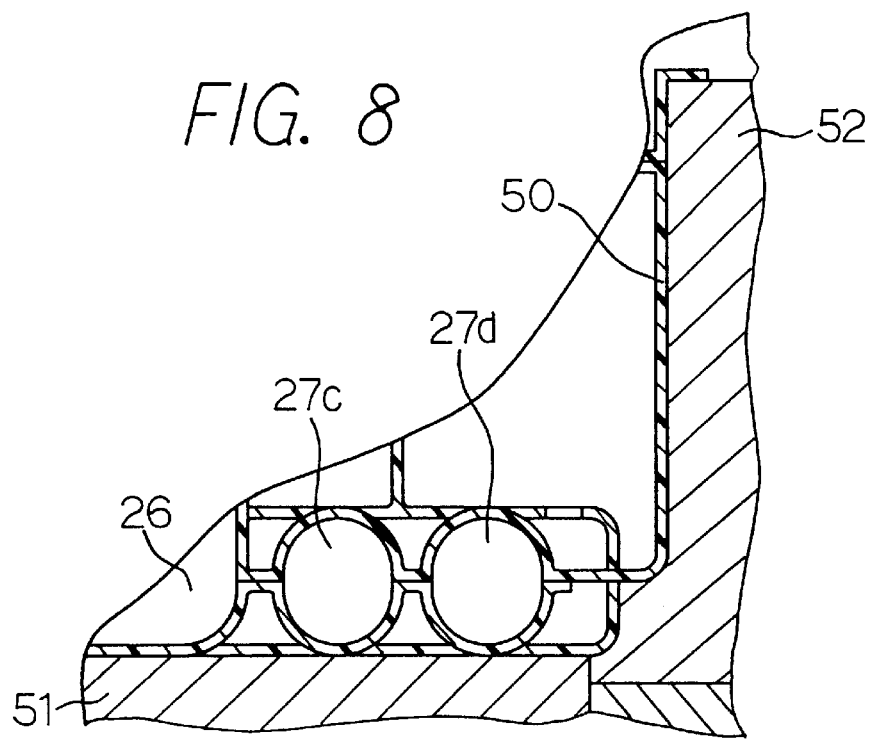
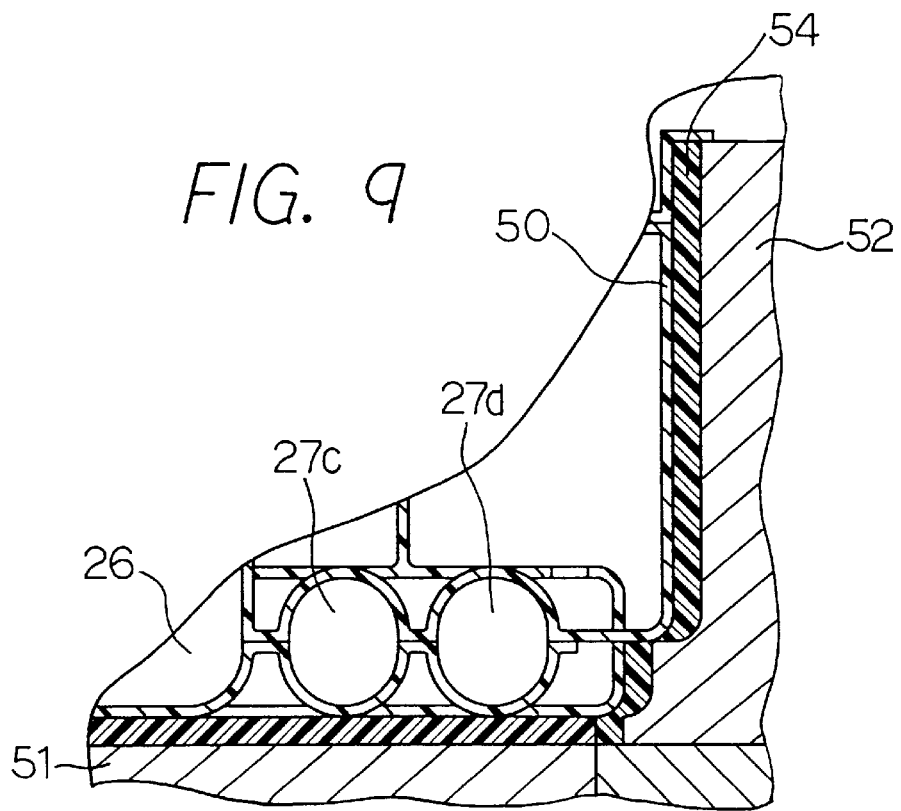

AIR INDUCTION UNIT FOR INTERNAL COMBUSTION ENGINE

This is a continuation of PCT Application PCT/JP97/04222, filed Nov. 19, 1997.

CROSS REFERENCE TO RELATED APPLICATION

The present application is based on and claims priority from Japanese Patent Applications Hei 8-311950 filed on Nov. 22, 1996, Hei 8-313947 filed on Nov. 25 and PCT/JP97/04222 filed on Nov. 19, 1998, the contents of which are incorporated herein by reference.

BACKGROUND OF THE INVENTION

1. Field of the Invention

The present invention relates to an improved air induction unit for reducing noises emitted from an engine and a temperature rise of intake air.

2. Description of the Related Art

European Patent 0523028B1 (U.S. Pat. No. 5,259,356) and JP-A-7-229454 (U.S. Pat. No. 5,477,819) disclose an air induction unit having a plurality of parts integrated therewith. In such systems, an intake air filter is disposed in an air filter case. The air filter has a sealed surface which is sealed and supported by the inner wall of the air filter case.

JP-A-7-148864 (U.S. Pat. No. 5,538,571) discloses an intake manifold which is blow-molded from a hollow inside portion to have a plurality of separate outside portions, which are bonded together thereafter.

Such an air filter as disclosed in European Patent 0523028B1 or JP-A-7-229454 must have a specific shape to be supported by the inside wall of the air filter case. It is sometimes difficult to install an air filter having the specific-shaped filter case together with various devices into the limited space of an engine compartment. Especially, if a plurality of parts are integrated into an air induction unit, the system becomes too bulky to be installed. Such an air filter also has the problem of passing intake air noises from air induction passages because the air induction passage has a single wall. In addition, heat radiation from the engine raises the temperature of the intake manifold and intake air, thereby deteriorating engine performance.

Because the air filter disclosed in JP-A-148864 has double walls with the outside members bonded thereto, noise and a temperature rise can be prevented to some extent. However, the effect is not satisfactory because the outside portions are merely bonded to the outer periphery of the inside portion.

SUMMARY OF THE INVENTION

A main object of the present invention is to provide an air induction unit which can be easily installed to a variety of the internal combustion engines.

Another object of the present invention is to provide an air induction unit in which the shape of the air filter case can be designed more freely.

Another object of the present invention is to provide an air induction unit for an internal combustion engine in which the transmission of noise and a temperature rise can be prevented effectively.

According to a main feature of the invention, an air induction unit for an internal combustion engine comprises an air filter, an intake manifold which has an inside wall and, an outside wall and a noise-and-heat-insulation layer between the inside wall and the outside wall. As a result, pulsating noises otherwise emitting to the outside from engine and temperature rise of the air passing through intake manifold can be effectively suppressed.

According to another feature of the invention, an air induction unit for an internal combustion engine comprises an air filter, a resinous filter case, and an intake manifold. The intake manifold is disposed in the filter case to form a double wall structure composed of a passage wall of the air induction manifold and a wall of the filter case. A noise-and-heat-insulation member is disposed between the passage wall and the wall of the filter. As a result, the double-wall structure and the noise-and-air-insulation member reduce noises emitted from the engine and a temperature rise of the air taken into engine to enhance the engine performance. In addition, the double-wall structure makes the air induction unit compact. The intake manifold can be made of resinous material so that the intake manifold can be integrated with the filter case. A fuel injector can be disposed in the filter case to suppress operation noises of the injector. The noise-and-heat-insulation member can be made of foamed material bonded to the case or formed when the filter case is formed.

According to another feature of the invention, an outlet duct is disposed in the filter case to induct the air filtered by the air filter. The outlet duct has a filter support which detachably supports the air filter separately from the filter case. As a result, the filter case can be designed irrespective of the holding structure of the air filter and the sealing surface thereof. Thus, the filter case can be designed more flexibly to be installed to the engine. In addition, a wide sectional area of the air induction passage can be provided to, thereby, decrease the pressure loss of the intake air.

According to another feature of the invention, the filter case accommodates therein a throttle valve and an intake manifold. As a result, the filter case, throttle valve and the intake manifold can be integrated for easy installation of the air induction unit.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 8 is a fragmentary sectional view of a surge tank covered by foamed resin;

FIG. 9 is a fragmentary sectional view of a surge tank covered by foamed resin;

DETAILED DESCRIPTION OF THE PREFERRED EMBODIMENTS

Figure 1:
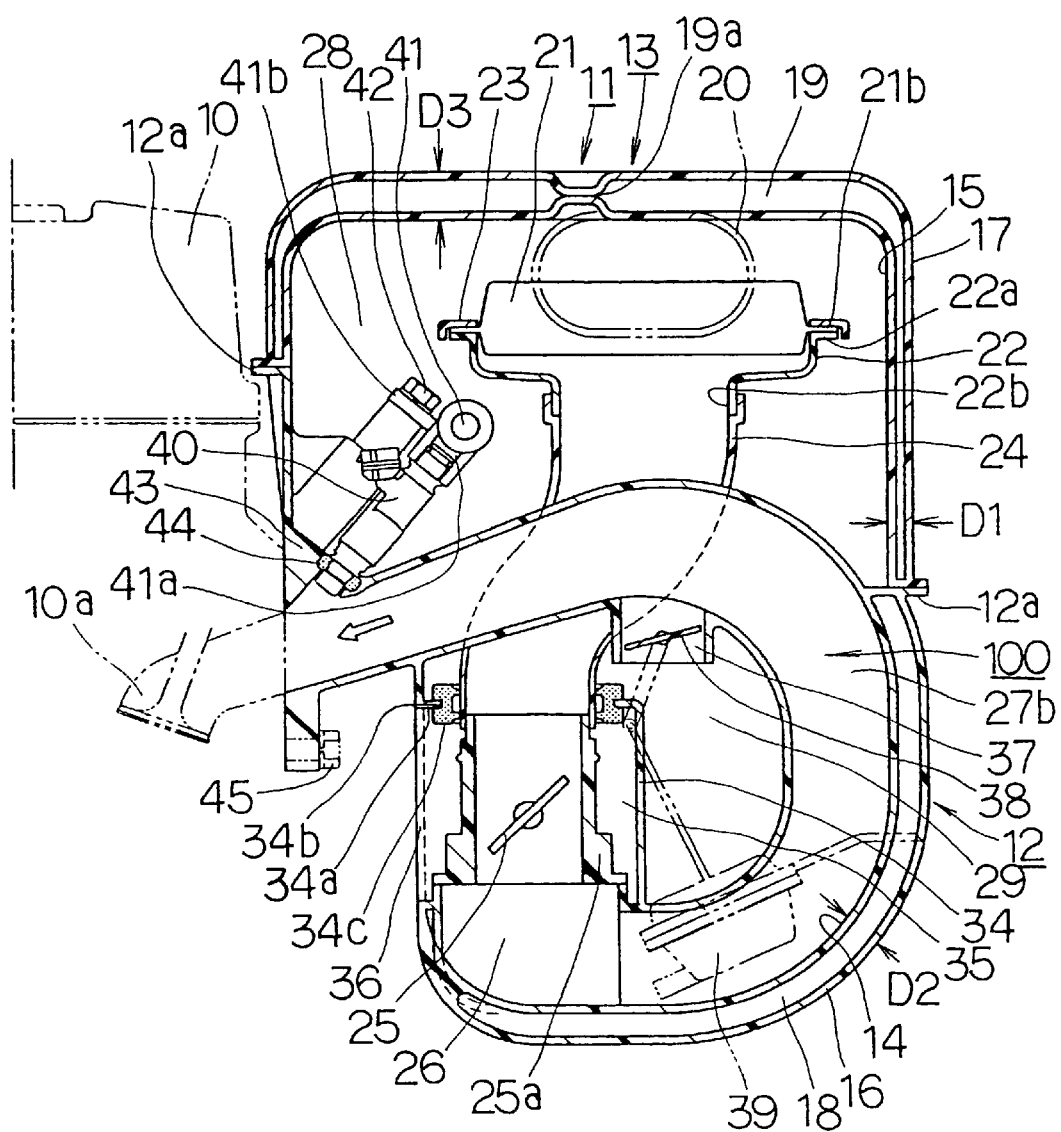
FIG. 1 is a longitudinal sectional view illustrating an air induction unit for an internal combustion engine according to a first embodiment cut along line I—I in FIG. 2.

An air induction unit according to a first embodiment of the present invention is described with reference to FIGS. 1–6.

Internal combustion engine 10 has four cylinders, and air induction unit 11 is disposed near engine 10. Air induction unit 11 has various parts thereof integrated into a compact space. A case of air induction unit 11 is composed of vertically extending main case 12 having a bottom member and cap 13 having a top member for closing upper opening 12a of main case 12. Cap 13 is fixed to opening portion 12a of main case 12 by a plurality of hinges (not shown) so that cap 13 can be opened or closed easily. The case is provided with a clamp member (not shown) for detachably holding cap 13.

Main case 12 and cap 13 are respectively molded from elastic and tough material such as nylon. Main case 12 has a double layered wall composed of inside member 14 and outside member 16, and cap 13, also, has double layered wall composed of inside wall member 15 and outside wall member 17. One of air layers 18, 19 having a thickness (such as 2–3 mm) is formed between each of inside walls 14, 15 and corresponding one of outside walls 16, 17.

Figure 2:
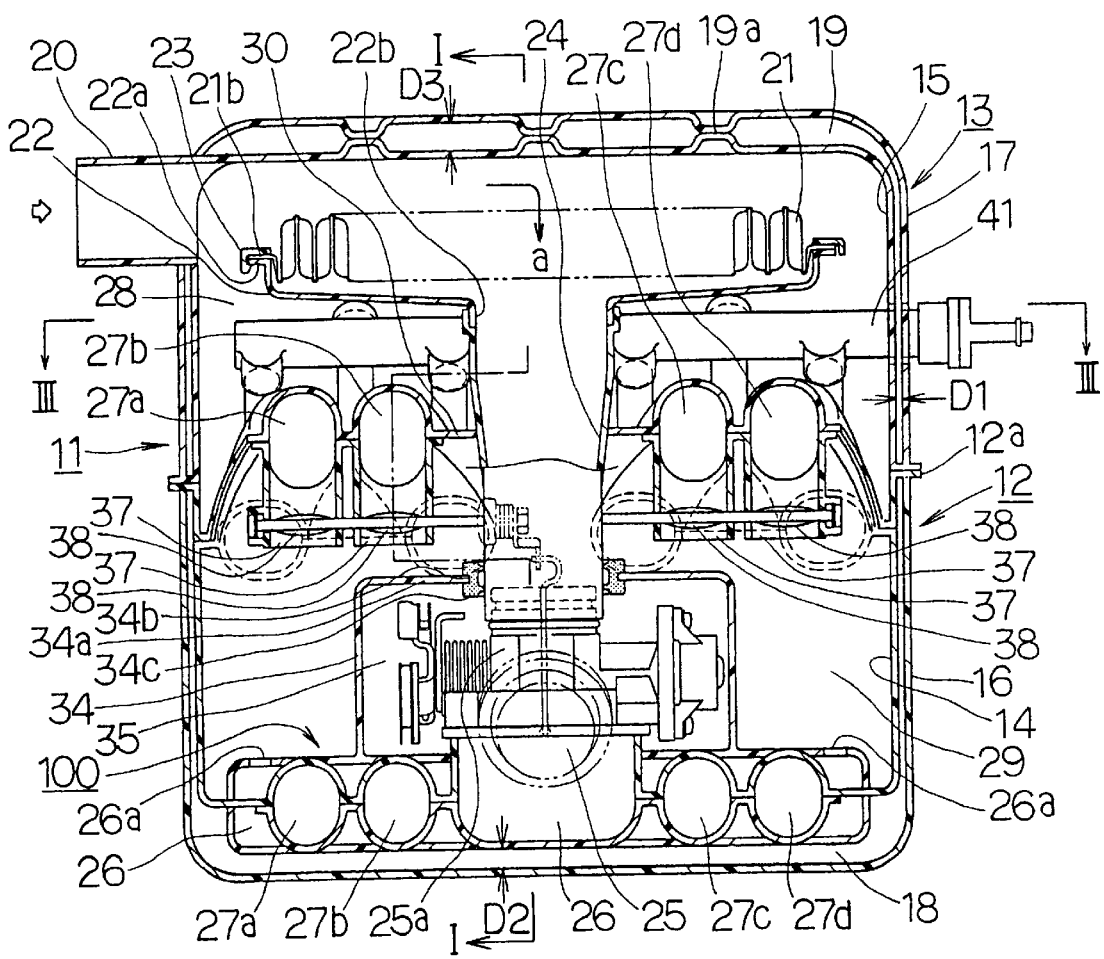
FIG. 2 is a longitudinal sectional view illustrating the air induction unit illustrated in FIG. 1.

Air layers 18, 19 prevent transmission of noise and heat. In FIGS. 1 and 2, thickness D1 at the narrowest portion of air layers 18, 19 is 2–3 mm, thickness D2 at the middle portion is 5–8 mm and thickness D3 at the widest portion of cap 13 is 12–18 mm. The thickness ranging from D1–D3 is mainly caused by the molding process. A plurality of pairs of projections 19a adjoining with each other are formed at the portions of inside and outside walls 15, 17 of cap 13 corresponding to air layer 19 of thickness D3, thereby increasing stiffness of cap 13 to suppress vibration thereof. The thickness of air layers 18, 19 is, preferably, 2 mm or more to effectively prevent transmission of noise and heat.

Cap 13 has horizontally extending air inlet 20 which is integrated with a side thereof to induct outside air from the engine compartment. The cross-section of air inlet 20 is generally elliptic (as shown in FIG. 1). Air filter 21 for cleaning the air inducted from air inlet 20 is disposed below the top of inside wall 15 of cap 13.

Figure 4:
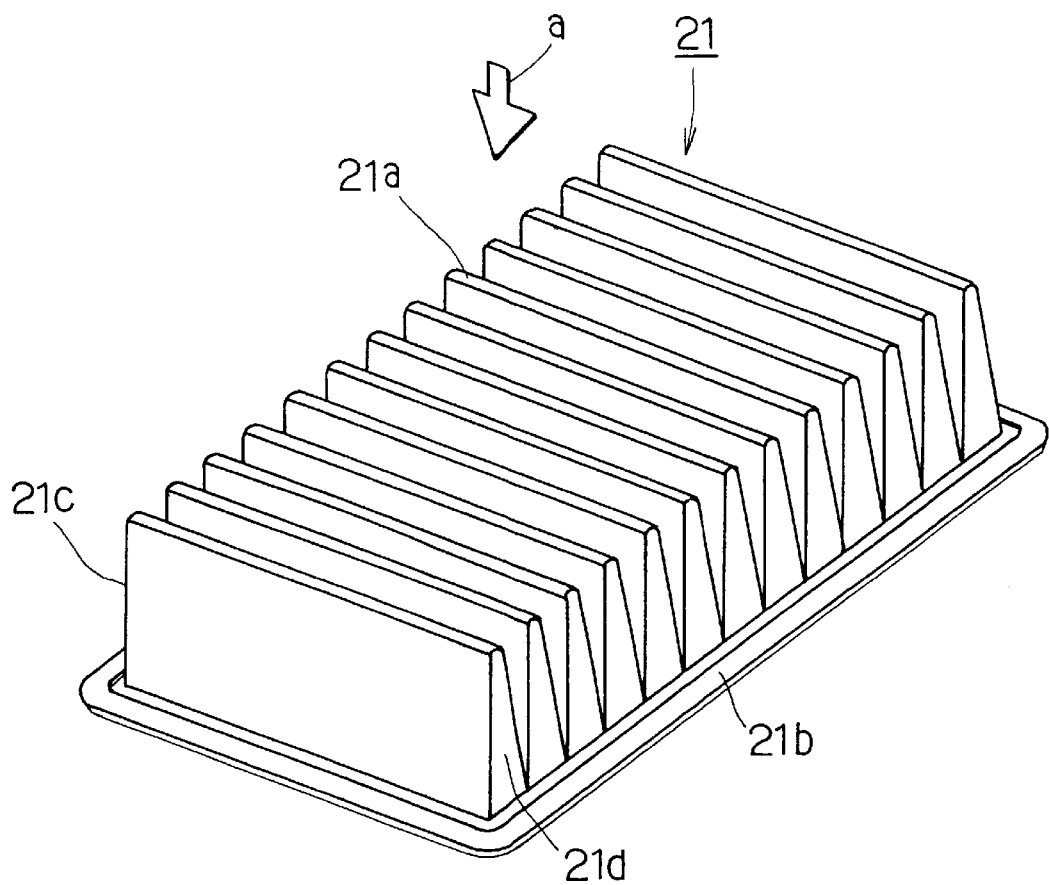
FIG. 4 is a perspective view of the air filter illustrated in FIGS. 1 and 2.

Air filter 21 has pleated filter member 21a which is generally rectangular and has flange portion 21b therearound as shown in FIG. 4. Pleated member 21a and flange portion 21b are integrally formed from the same filter material (e.g. resinous unwoven fabric cloth or filter paper). Opposite sides 21c, 21d of each pleated portion of filter member 21a are closed to form a bag. As air passes through filter member 21a as indicated by arrow a in FIG. 4 and FIG. 2, dust and the like are removed from the air, thereby cleaning the air.

Rectangular pan-like resinous filter support 22 is disposed under air filter 21, and flange portion 22a formed around filter support 22 supports flange portion 21b of air filter 21. Flange portion 22a and flange portion 21b are detachably fastened by clamp 23. Therefore, air filter 21 is supported and held by filter support 22 separately from main case 12 and cap 13.

Filter support 22 has, at the center thereof, cylindrical member 22b for sending out the cleaned air. Cylindrical member 22b is welded to the upper portion of outlet duct 24. Outlet duct 24 is generally cylindrical and is disposed at the center of the space defined by main case 12 and cap 13. Outlet duct 24 extends vertically and bends to the left at the lower portion thereof as shown in FIG. 1.

The lower end of outlet duct 24 is connected with the upper end of resinous body 25a of throttle valve unit 25. Throttle valve unit 25 controls air taken into the internal combustion engine 10 according to operation of an accelerator in a well-known manner. Surge tank 26 is disposed under (at the down stream side of) throttle valve unit 25 to moderate the pulsation of the intake air.

Figure 3:
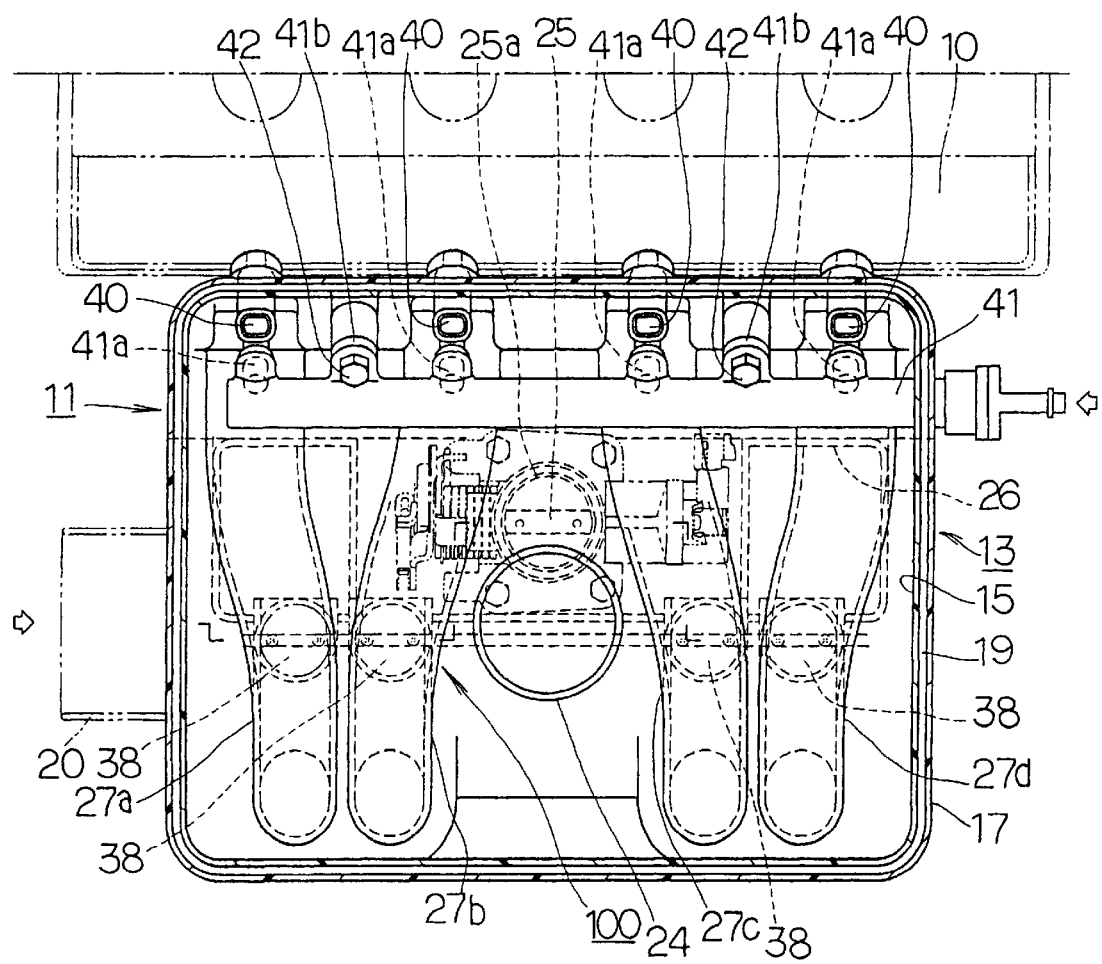
FIG. 3 is a sectional view of the air induction unit cut along line III—III in FIG. 2.

Surge tank 26 is disposed at the lowest portion inside main case 12 and is rectangular as shown by broken lines in FIG. 3. Inlets of intake manifold pipes 27a–27d open to the inside of surge tank 26. There are four intake manifold pipes to correspond to four cylinder engine 10 in this embodiment.

Intake manifold pipes 27a, 27c, 27d, which are not shown in FIG. 1, are almost the same as intake manifold pipe 27b in shape. That is, each a 180° semicircular portion extending upward from the lower portion of the space and straight portion extending forward therefrom to one of intake ports 10a of engine 10.

Main case 12 is fastened by bolts 45 or the like (shown in FIG. 1) to connect intake manifold pipes 27a–27d with intake ports 10a.

Figure 5:
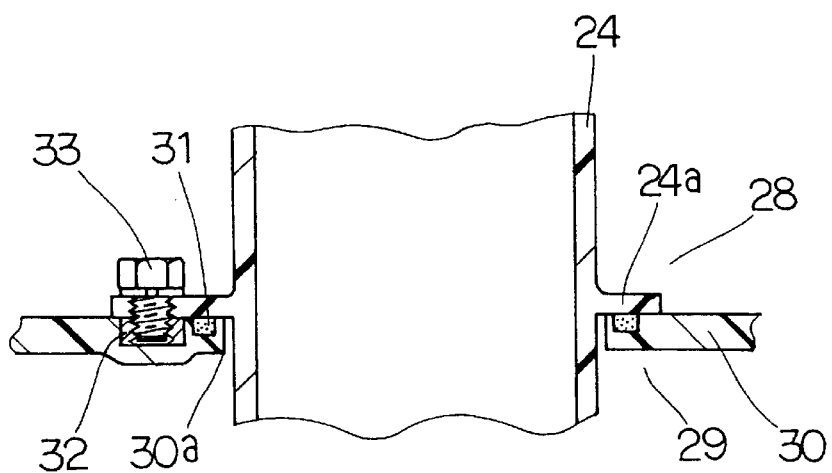
FIG. 5 is an enlarged fragmentary view of a support of the outlet duct illustrated in FIG. 2.

Dusty side space 28 is disposed inside the cap 13 and is connected to air inlet 20. Clean side space 29 is disposed inside main case 12 and is connected to the inside of surge tank 26 through a plurality of connecting holes 26a (shown in FIG. 2). Dusty side space 28 and clean side space 29 are separated by manifold pipes 27a–27d and resinous partitions 30 integrally formed between the pipes from each other (as shown in FIG. 2). As shown in FIG. 5, outlet duct 24 extends through the hole 30a formed at the central portion of partition 30, and ring-shaped rubber-seal-gaskets 31 is disposed around hole 30a. Outlet duct 24 has ring-shaped flange portion 24a integrated therewith to compress seal-gasket 31 thereby.

A plurality of nuts 32 are insert-molded into portions of partition 30 around seal-gasket 31 so that outlet duct 24 can be detachably fixed to partition 30 and hermetically sealed after bolts 33 are screwed into respective nuts 32.

As shown in FIGS. 1 and 2, resinous partition 34 extends from the upper wall surface of surge tank 26 around resinous body 25a of throttle valve unit 25 to separate the space 35 around throttle valve unit 25 from clean side space 29 of main case 12. Space 35 is connected to the inside of the engine compartment through opening 36, in other words, it is connected to the dusty side space. Opening 36 is formed so that throttle valve unit 25 can be installed into the inside of main case 12 therethrough.

Upper central portion 34a of partition 34 has through hole 34b through which lower portion of outlet duct 24 extends and rubber seal-gasket 34c inserted into through hole 34b to isolate dusty side space 35 from clean side space 29.

Intake manifold 100 is made of resinous material and composed of surge tank 26, intake manifold pipes 27a–27d and partitions 30, 34. The wall of the passages of intake manifold formed opposite outside wall 16 of main case 12 forms inside wall 14 of main case 12.

Passage 37 connecting to clean side space 29 is formed in a portion of each of intake manifold pipes 27a–27d, and movable air-intake valve 38 is installed therein to be opened or closed by actuator 39 such as a vacuum motor.

The outlet side of each of intake manifold pipes 27a–27d (upstream side of intake port 10a of engine 10) has fuel injector 40 for injecting fuel or gasoline. As shown in FIG. 1, fuel injector 40 is disposed in dusty side space 28, and fuel delivery pipe 41 has branch pipes 41*a*. Each of branch pipes 41*a* is connected one of fuel injectors 40 with its pointed end fitted into the fuel inlet of fuel injector 40 via a seal.

A pair of flanges 41*b* are formed on different portions of fuel delivery pipe 41 to fix the same to pedestals 43 formed on main case 12, thereby detachably fixing injectors 40 and fuel delivery pipe 41 to pedestals 43. Fuel injectors 40 are fixed to pedestals 43 hermetically via rubber seal gasket 44 so that the outside air in dusty side space 28 can be prevented from coming into intake manifold pipes 27*a*–27*d*.

Fuel injectors 40 are electro-magnetically controlled to open the valves thereof in a well-known manner. An end (right end in FIG. 3) of fuel delivery pipe 41 protrudes outward from main case 12 to be connected to a fuel supply pump through a fuel pipe (not shown) to induct fuel supplied by the fuel supply pump into fuel delivery pipe 41.

In operation, when the internal combustion engine is operated, outside air is taken into air inlet 20 of cap 13. The air flows into space 28 and passes through filter member 21*a* of filter 21 in the direction indicated by arrow a in FIG. 4 and FIG. 2 so that dust in the air can be removed and cleaned.

The cleaned air is inducted through pan-like filter support 22 and outlet duct 24 into throttle valve unit 25. When the air passes through surge tank 26, the pulsation of the pressure of the air is moderated. Subsequently, the air is distributed to respective manifold pipes 27*a*–27*d* to be sent to the respective cylinders of internal combustion engine 10.

On the other hand, the fuel is pumped by the fuel supply pump (not shown) and sent to fuel delivery pipe 41 to be distributed to respective fuel injectors 40. Fuel injectors 40 are electronically controlled to inject fuel into the outlet portions of respective intake manifold pipes 27*a*–27*d*. Thus, the fuel and air are mixed and inducted to the respective cylinders of engine 10 from intake port 10*a* thereof.

In air induction unit 11, which is disposed adjacent to engine 10, both case 12 and cap 13 have double-walls containing air layers 18, 19 between inside walls 14, 15 and outside walls 16, 17 to prevent transmission of noise and heat.

Since fuel injectors 40 are disposed in dusty side space 28 confined by cap 13 and main case 12 as shown in FIG. 1, the operation noises of fuel injectors 40 can be also prevented effectively by air layers 18, 19 from emitting to the outside. Since air layers 18, 19 are formed between inside walls 14, 15 and outside walls 16, 17 to suppress transmission of noises and heat according to this embodiment, the weight of the filter case can be minimized.

Main case 12 and intake manifold 100 are formed from a resinous material having a melting point lower than that of the hollow member containing air layer 18. This is so-called lost wax process. However, main case 12 and intake manifold 100 can be formed from a plurality of molded pieces welded by means of vibration welding. The hollow member containing air layer 18 can be formed by gas-air injection molding, blow molding or multi-piece molding. Cap 13 having the double-wall structure containing air layer 19 can be formed by blow molding also. It can be formed from a plurality of molded pieces welded by means of vibration welding.

Figure 6:
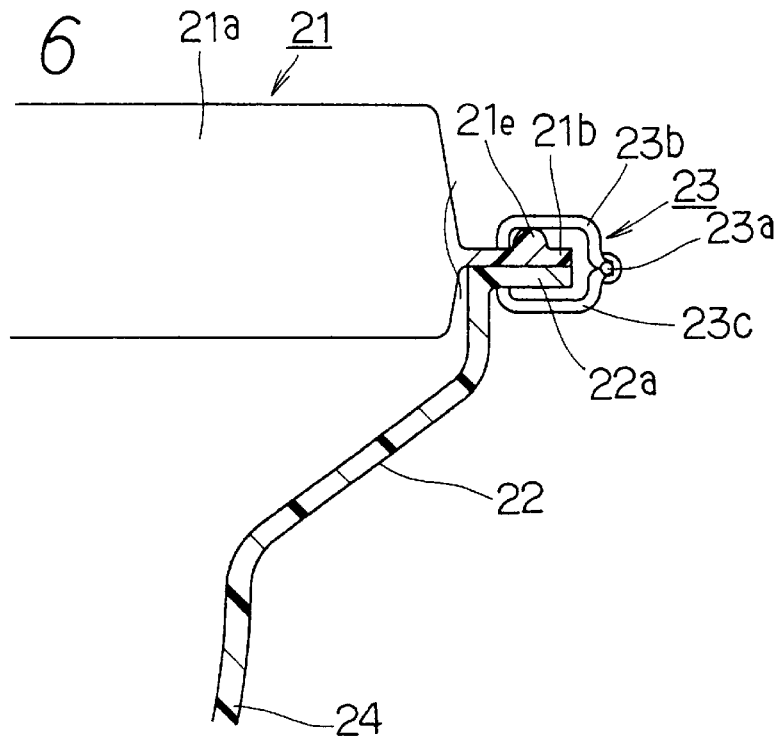
FIG. 6 is a fragmentary sectional view illustrating a support structure of the air filter.

FIG. 6 illustrates a support structure of air filter 21 and filter support 22. Ridge 21*e* is formed integrally on the upper surface of flange portion 21*b* of air filter 21. Flange portion 21*b* is put on flange portion 22*a* of filter support 22, and resinous or metallic clamp 23 is engaged with ridge 21*e* to press both flange portions 21*b* and 22*a*, thereby fixing air filter 21 and filter support 22 together. Clamp 23 has pivot 23*a* and a pair of hooks 23*b*, 23*c* pivoting thereon.

Figure 7:
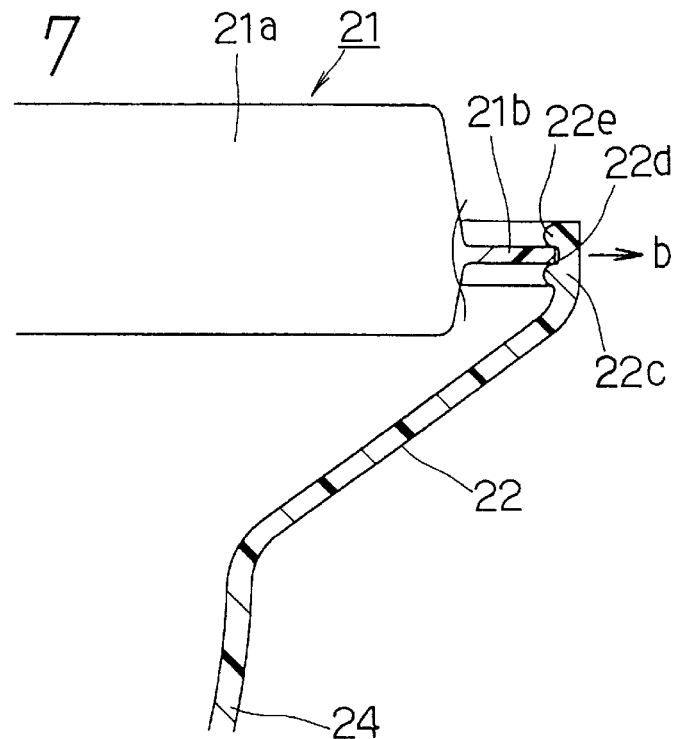
FIG. 7 is a fragmentary sectional view illustrating another support structure of the air filter.

Filter support 22 can have support wall 22*c* at its open end as shown in FIG. 7. Support wall 22*c* extends along the thickness of air filter around the outer periphery of flange portion 21*b* of air filter 21 and has groove 22*d* receiving the outer periphery of flange portion 21*b*. When flange portion 21*b* is inserted into groove 22*d*, support wall 22*c* is bent outward (as indicated by arrow b in FIG. 7) so that the outer periphery of flange portion 21*b* can get into groove 22*d* across convex portion 22*e*. After flange portion 21*b* gets into groove 22*d*, support wall 22*c* springs back to hold flange portion 21*b* in groove 22*d*.

(Other Embodiments)

Polyurethane foam or other noise and heat insulation member can be substituted for air layers 18, 19 disposed between inside walls 14, 15 and outside walls 16, 17. Such a noise-and-heat-insulation member can be formed by foaming portions of the inside and outside walls.

If intake manifold 100 is disposed outside the filter case, intake manifold 100 is formed to have such a double-wall structure separately from the air filter case, and the noise-and-heat-insulation member is disposed between the inside and outside walls. If such a noise-and-heat-insulation member is put to cover one surface or both surfaces of main case 12, cap 13 or intake manifold 100, the double-wall structure is not necessary. A foaming resin can be added to form such a foam member when main case 12, cap 13 or intake manifold 100 are molded.

As illustrated in FIG. 8, intake manifold 100 having surge tank 26 and intake manifold pipes 27*a*–27*d* integrally therewith in molding dies 51, 52. Molding die 51 can be moved downward and molding die 52 can be moved to right so that foaming resin 54 for the noise-and-heat-insulation member can be put into the spaces formed by the move as shown in FIG. 9.

Figure 10:
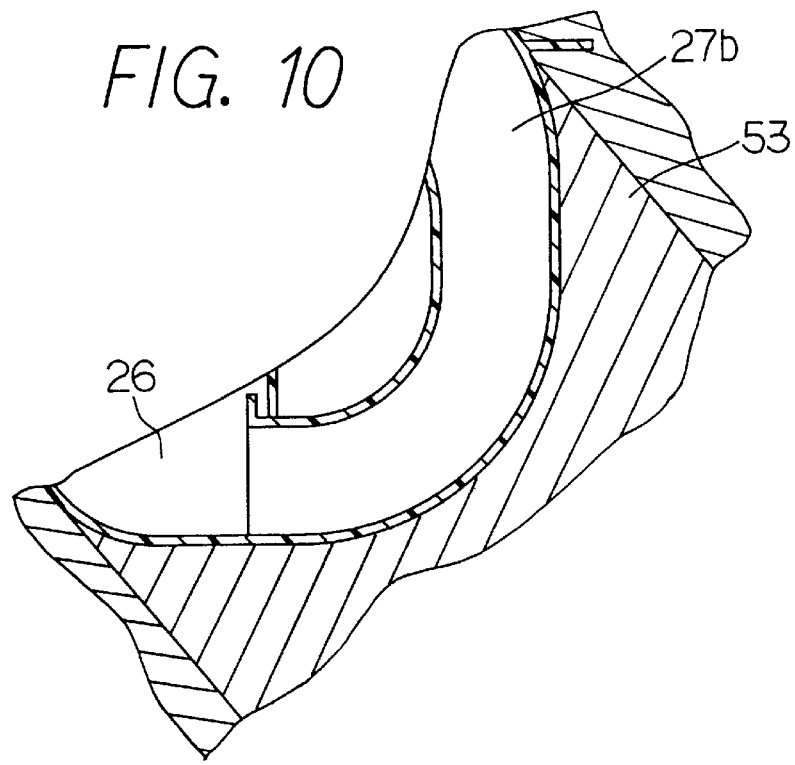
FIG. 10 is a fragmentary sectional view of an intake manifold.
Figure 11:
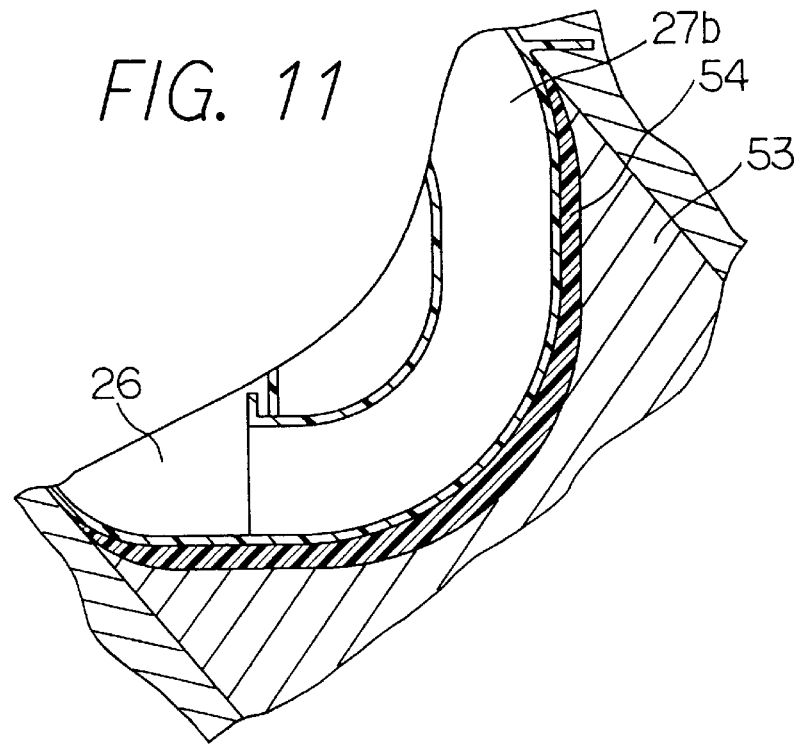
FIG. 11 is a fragmentary sectional view of the intake manifold illustrated in FIG. 10, which is covered by foamed resin.

As illustrated in FIGS. 10 and 11, a portion of intake manifold pipes 27*a*–27*d* is covered by foamed resin 54. As illustrated in FIG. 10, a portion of intake manifold 100 composed of surge tank 26 and intake manifold pipes 27*a*–27*d* is put in mold die 53. As illustrated in FIG. 11, mold die 53 is moved to the right to form a space to be filled with foaming resin 54, thereby forming the noise-and-heat-insulation member.

Thus, air filter 21 can be supported separately from main case 12 and cap 13, thereby increasing the degree of freedom in designing main case 12 and cap 13. It is not necessary to design air filter 21 having specific size. It is also not necessary to remove air filter 21 from fuel supply system when fuel injectors 40 and fuel delivery pipe 41 is installed into the inside of main case 12 and cap 13. Accordingly, maintenance work can be carried out easily, and dust can be prevented from entering the clean side disposed at the downstream side of air filter 21 during the maintenance work. Filter support 22 can be separated more from the fuel supply system than the same shown in FIG. 1 for easier maintenance work.

Because filter support 22 is separated from main case 12 and cap 13 and stands like a mushroom, dust having entered the inside of main case 12 and cap 13 is prevented from entering the inside of filter support 22 when filter 21 is replaced.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

We claim:

1. An air induction unit for an internal combustion engine including an air filter, a resinous filter case for accommodating said air filter, an intake manifold connected to said air filter for inducting air from said air filter to an air induction port of said engine, wherein said intake manifold comprises a passage wall disposed in said filter case to form an inside wall spaced apart from a wall of said filter case, thereby forming a double wall structure, and a noise-and-heat-insulation member is disposed between said inside wall and said wall of said filter case.

2. An air induction unit for an internal combustion engine having an air induction port, comprising:

an air filter for filtering air supplied to said internal combustion engine, and a filter case for accommodating said air filter, a noise-and-heat-insulation member for covering said filter case, and a resinous intake manifold, disposed in said filter case and connected to said air filter, for inducting said air filtered by said air filter to said air induction port of said internal combustion engine.

3. The air induction unit as claimed in claim 2 further comprising:

a fuel supply component for supplying fuel to said engine disposed in said case.

4. The air induction unit as claimed in claim 3, wherein said fuel supply component comprises a fuel injector.

5. The air induction unit as claimed in claim 2, wherein said filter case comprises an inside wall and an outside wall and said noise-and-heat-insulation member disposed between said inside wall and said outside wall.

6. The air induction unit as claimed in claim 5, wherein said noise-and-heat-insulation member is an air layer.

7. The air induction unit as claimed in claim 5, wherein said noise-and-heat-insulation member is made of resinous material.

8. The air induction unit as claimed in claim 7, wherein said noise-and-heat insulation member is made of foamed material.

9. The air induction unit as claimed in claim 2, wherein said noise-and-heat-insulation member is made of foamed material bonded to said filter case.

10. The air induction unit as claimed in claim 2, wherein said noise-and-heat insulation member is formed from foamed material integral with said filter case.

11. The air induction unit as claimed in claim 2, wherein said intake manifold is composed of a surge tank and intake manifold pipes and wherein at least a portion of said surge tank and intake manifold pipes is covered with said noise-and-heat-insulation member.

12. The air induction unit as claimed in claim 2, wherein said filter case is composed of a main case and a cap for closing an upper opening of said main case.

13. The air induction unit as claimed in claim 12, wherein said main case and said cap each defining a double layer wall, said noise-and-heat-insulation member being disposed between inner and outer walls of at least one of said double layer walls.

14. The air induction unit as claimed in claim 13, wherein said noise-and-heat-insulation member is an air layer.

15. The air induction unit as claimed in claim 13, wherein said noise-and-heat-insulation member is made of resinous material.

16. The air induction unit as claimed in claim 11, wherein said filter case is composed of a main case and a cap for closing an upper opening of said main case, said main case and said cap each defining a double layer wall, said noise-and-heat-insulation member being disposed between inner and outer walls of at least one of said double layer walls, at least a portion of an inner wall of said double layer wall of said main case being defined by at least a portion of said resinous intake manifold.

17. The air induction unit as claimed in claim 16, wherein said noise-and-heat-insulation member is made of a foamed material bonded to said filter case.

18. The air induction unit as claimed in claim 16, wherein said noise-and-heat-insulation member is formed from foamed material integral with said filter case.

* * * * *